United States Patent [19]

de Jonge et al.

[11] 4,091,429

[45] May 23, 1978

[54] DEVICE FOR THE MAGNETIC RECORDING BY MEANS OF A MAGNETIC STRIP DOMAIN AS A RECORDING/PLAYBACK HEAD

[75] Inventors: Frederik Ate de Jonge; Jan Willem Frederik Dorleijn; Willem Frederik Druyvesteyn; Gerrit Jan Koel, all of Eindhoven, Netherlands

[73] Assignee: U.S. Philips Corporation, New York, N.Y.

[21] Appl. No.: 751,345

[22] Filed: Dec. 16, 1976

Related U.S. Application Data

[63] Continuation of Ser. No. 592,451, Jul. 2, 1975, abandoned, which is a continuation of Ser. No. 430,787, Jan. 4, 1974, abandoned.

[30] Foreign Application Priority Data

Jan. 10, 1973  Netherlands ..................... 7300311
Sep. 7, 1973  Netherlands ..................... 7312331

[51] Int. Cl.² ................... G11B 5/30; G11B 5/12
[52] U.S. Cl. ..................... 360/110; 360/125

[58] Field of Search ............... 360/110, 125; 340/174 TF

[56] References Cited

U.S. PATENT DOCUMENTS 3,793,639  2/1974  Enz ........................... 360/110
3,793,640  2/1974  Potgiesser ..................... 360/110

Primary Examiner—Vincent P. Canney
Attorney, Agent, or Firm—Frank R. Trifari; Robert S. Smith

[57] ABSTRACT

The invention relates to a device for magnetic recording which is provided with a layer of a magnetizable material which is provided on a support and has an easy axis of magnetization which is at least substantially perpendicular to the plane of the layer, which layer is suitable to support magnetic domains having a direction of magnetization which is opposite to the direction of magnetization of the remainder of the layer, the device also comprising a device for producing a magnetization field having a field direction perpendicular to the plane of the layer, said layer being destined to cooperate with a recording medium which is relatively movable with respect to the layer.

15 Claims, 8 Drawing Figures

DEVICE FOR THE MAGNETIC RECORDING BY MEANS OF A MAGNETIC STRIP DOMAIN AS A RECORDING/PLAYBACK HEAD

This is a continuation of Application Ser. No. 592,451, filed July 2, 1975, now abandoned, which was a continuation of Application Ser. No. 430,787, filed Jan. 4, 1974, which is also abandoned.

It has already been proposed to use the stray field of a cylindrical magnetic domain (so-called "bubble") for the recording of information on a magnetisable recording medium. The component of such a stray field which is parallel to the plane of the layer supporting the domain has approximately the same effect on a recording medium as the field in the proximity of the operative gap of a conventional magnetic head.

Although the use of a "bubble" head for magnetic recording presents a number of advantages as a result of which it is possible, for example, to obtain larger track densities or to realize a scanning head without mechanically moving components, it also involves drawbacks. Once a given material has been chosen for the "bubble"-plate, the smallest track width to be recorded with it is established in that the dimensions of "bubbles" depend on the material in which they are produced and in that the "bubble" dimension determines the track width. This may be a drawback in certain cases. In addition, the dimensions of a cylindrical magnetic domain as a function of a signal to be recorded vary in two dimensions, so that recording can be carried out both in the relative direction of movement of the recording medium and in a direction perpendicular thereto. This means that on a signal which has been recorded at one instant a subsequent signal is partly recorded at the next instant.

It is the object of the present invention to provide a device of the above-mentioned type which does not exhibit the above-mentioned drawbacks. For that purpose, the device according to the invention is characterized in that the layer of magnetisable material comprises at least one elongate magnetic domain (so-called strip domain).

As will be explained in greater detail hereinafter, the use of strip domains presents a large number of advantages. For example, it is possible by a suitable choice of the value for the bias magnetisation field either to vary mainly the width of the strip domain as a function of a signal to be recorded, or to vary mainly the length of the strip domain as a junction of a signal to be recorded, which enables a variety of applications.

A preferred embodiment of the device according to the invention is therefore characterized in that means are present to modulate one dimension of the elongate domain in conformity with an information signal. If said dimension is the length of the strip domain, the plate of magnetisable material is preferably arranged so that the length dimension of the domain is transverse to the relative direction of movement of the recording medium. In that case a track may be recorded which, dependent upon the supplied signal, is varied in width.

It is also possible to arrange the plate of magnetisable material in such manner that the length direction of the domain is parallel to the relative direction of movement of the recording medium. By varrying the length of the strip, the value of the stray field varies in that case at a certain distance from the plate and a signal with depth modulation is recorded on the recording medium. In order to ensure that a signal is not recorded on an already recorded signal, the plate is preferably arranged at an angle relative to the recording medium.

If the dimension of the domain which is varied is the width, the plate of magnetisable material is constructed so according to the invention as to comprise a number of elongate domains which are all parallel to the relative direction of movement of the recording medium. The advantage of the use of a plate having a number of mutually parallel domains is that such a domain structure in itself is stable with an external field zero, so that no bias magnetisation field is necessary. Either the width of all the strips can be modulated simultaneously in conformity with a signal to be recorded, or the width of each strip can be modulated individually by applying a current loop around each strip. In this manner, recording is carried out as it were with the edge of the plate of magnetisable material. In order to ensure that a signal is not recorded on an already recorded signal, the plate in this case also is preferably arranged at an angle relative to the recording medium.

The gist of the invention as well as a number of application possibilities will be described in greater detail with reference to the drawing.

Figure 5:
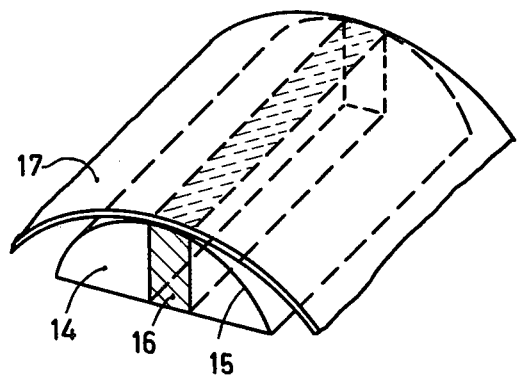
Figure 6:
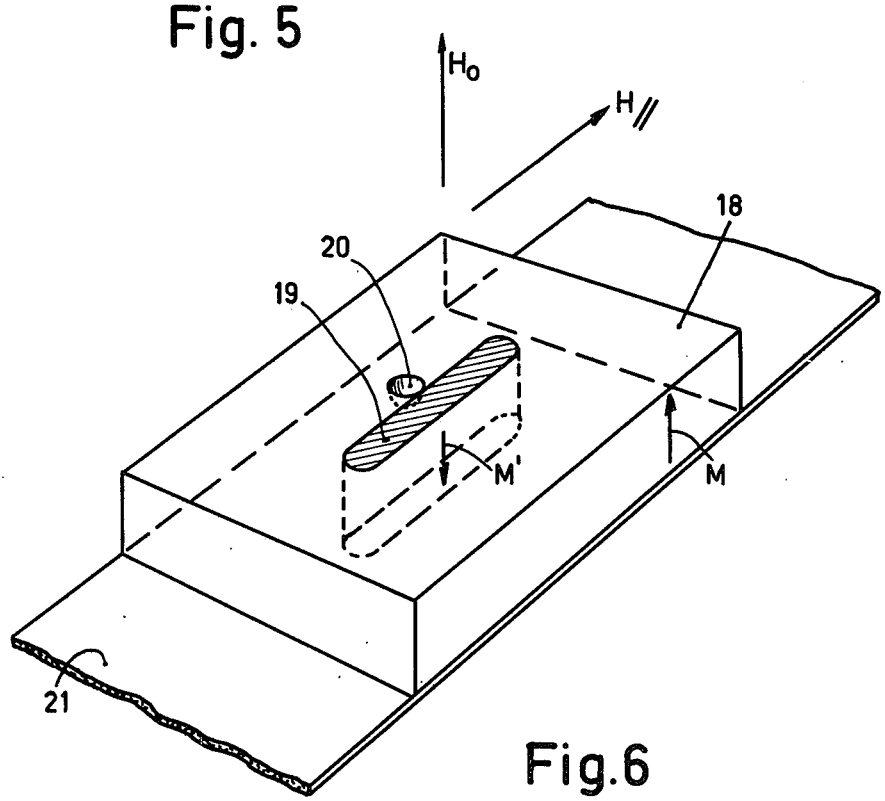
Figure 7:
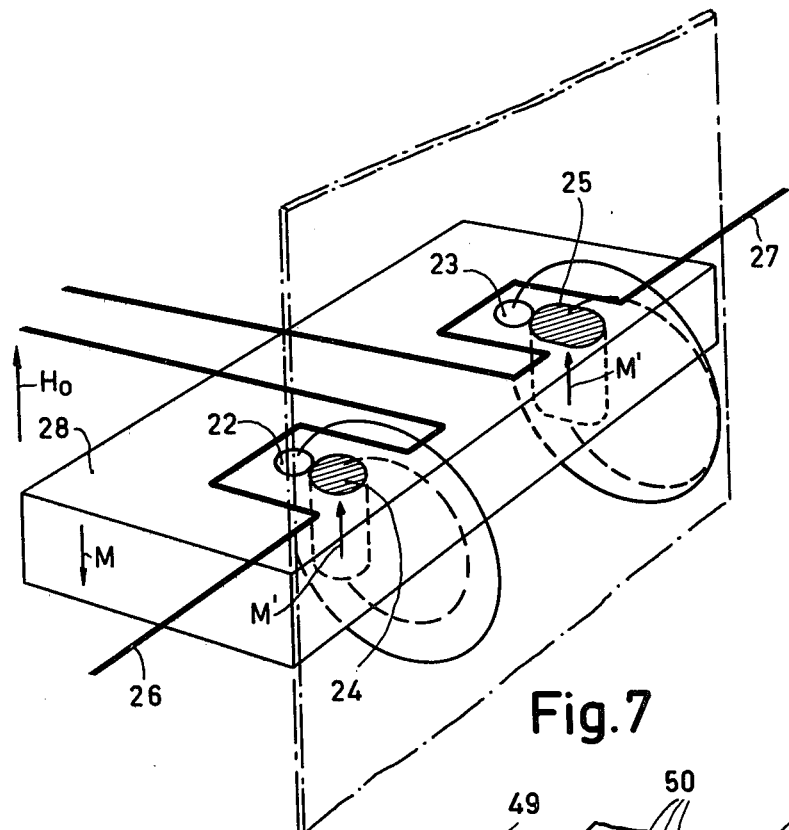
Figure 8:
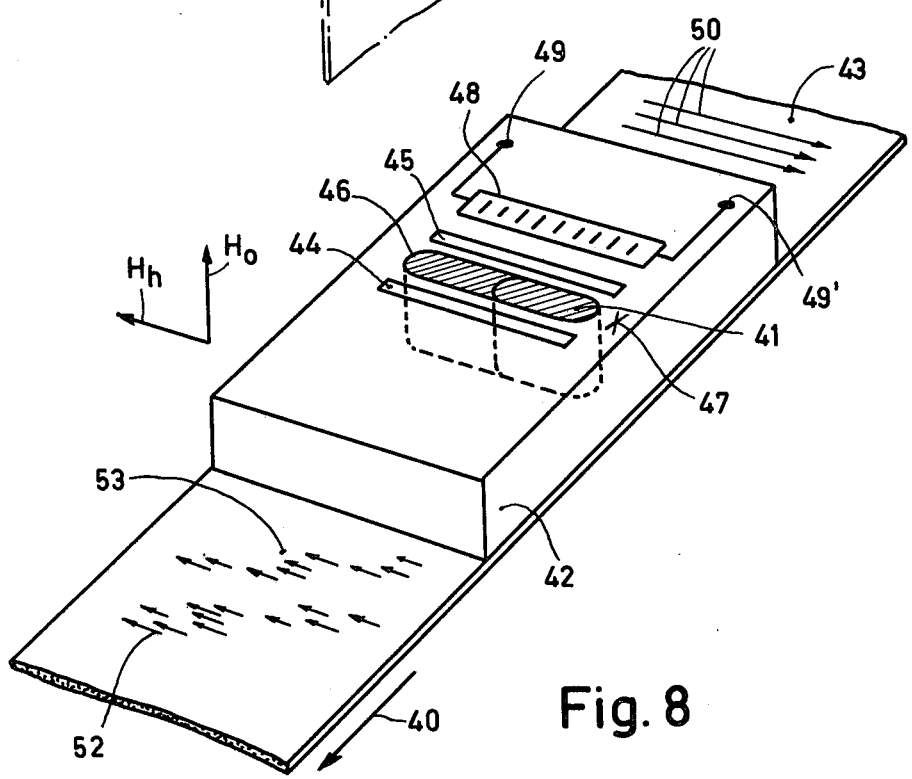

FIG. 5 shows a plate of magnetisable material having a curved surface and a strip domain fixed by it, FIG. 6 shows a plate of magnetisable material having a strip domain the direction of which is determined by an auxiliary field, FIG. 7 shows a plate of magnetisable material having at the edge magnetic domains which are in different conditions, FIG. 8 shows a device having a strip domain which can be used for "scanning" recording and playback.

Figure 1:
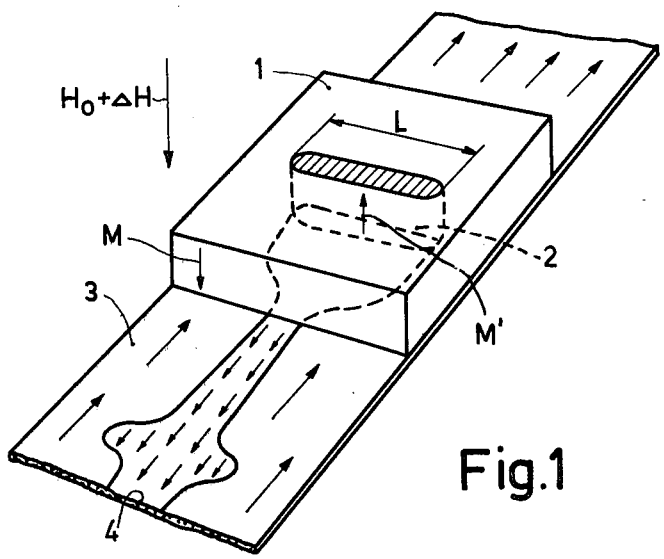
FIG. 1 shows a plate of magnetisable material which comprises a strip domain and records a signal on a tape.

FIG. 1 shows a plate 1 of magnetisable material having an easy axis of magnetisation perpendicular to the plane of the plate, in which plate an elongate magnetic domain 2 (strip domain) exists under the influence of the field $H_0$, which domain has a direction of magnetisation M' which is opposite to the direction of magnetisation M of the remainder of the plate. The plate 1 co-operates with a magnetisable recording medium 3. Under the influence of a variation $\Delta H$ of the field $H_o$, the length L of the strip domain 2 varies. In this manner, a track 4 of varying width can be recorded on the medium 3. There always exists a range of values of the field $H_o$ within which the dimensions of a strip domain can be varied in a reproducable manner. If desired said range can be increased by ensuring that in the plane of the domain plate such an anisotropy occurs that the domain wall energy in one direction differs from that in the direction perpendicular thereto. In the frame work of the invention such an anisotropy in the wall energy may, for example, be a result of a proper choice of the domain plate material or of the provision of a narrow groove in the domain plate.

The device according to the invention is preferably used while applying a magnetic device for producing, at the area of the recording medium, a magnetic field having a field strength which is smaller than the coercive field strength of the recording medium but which is so large that, together with the stray field of a domain, it can influence the magnetisation condition of the recording medium and having a direction which is parallel to the relative direction of movement thereof. By means of such an auxiliary field, any arbitrary recording medium can be recorded irrespective of the coercive field strength thereof, provided the spread in the coercive force thereof is sufficiently small. An additional advantage is that by switching on and off said auxiliary field, the recording medium is recorded or is not recorded by the domain (return to zero). As will be explained hereinafter, this is of particular importance if an acicular strip domain is used for magnetic recording the length of which cannot be modulated.

Figure 2:
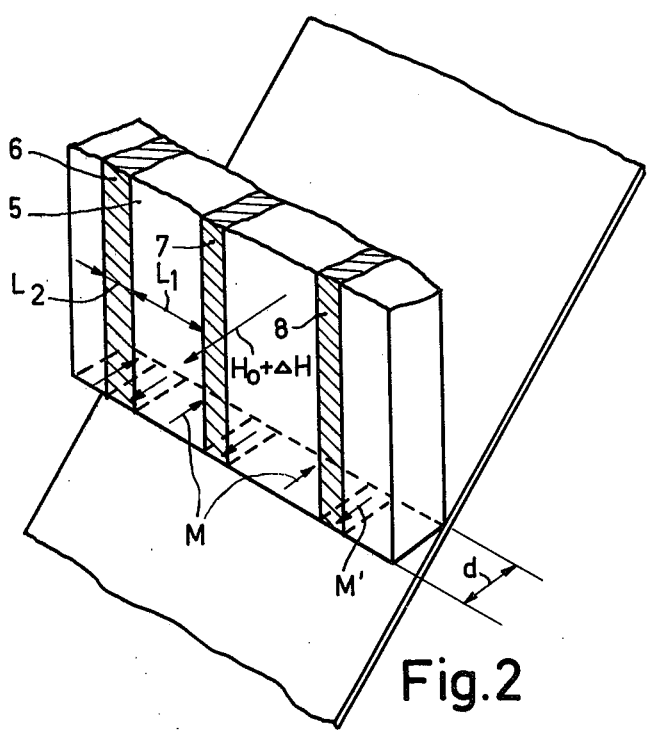
FIG. 2 shows a plate of magnetisable material which comprises a number of mutually parallel strip domains.
Figure 3:
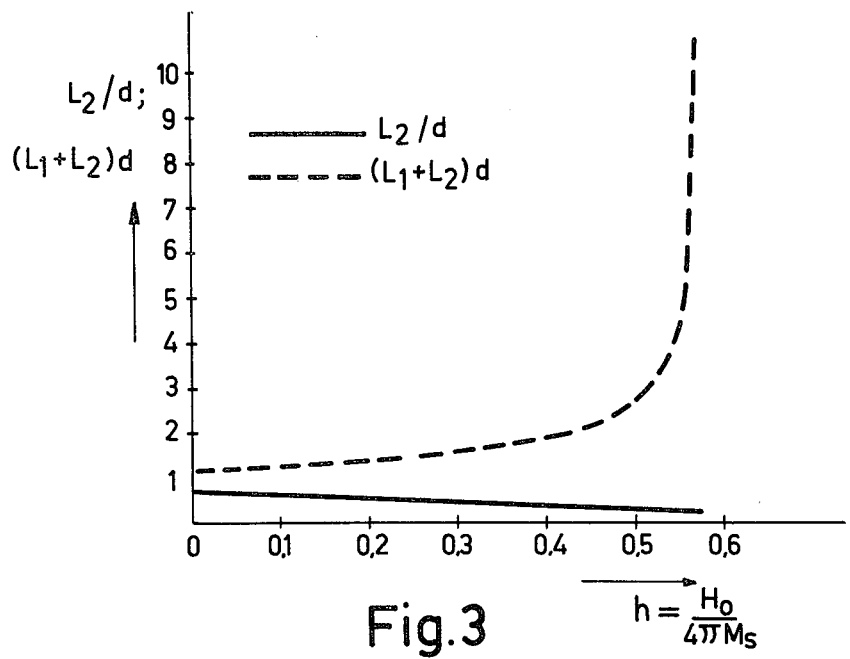
FIG. 3 is a graph showing the dependence of the width and the distance of the strip domains shown in FIG. 2 as a function of the external field.

FIG. 2 shows a plate 5 having a thickness $d$ which has the same properties as the plate 1 in FIG. 1. In this case, however, the plate 5 comprises a number of mutually parallel strip domains 6, 7 and 8. The strength of the external field $H_o$ is chosen to be so in this case that with a variation $\Delta H$ of the field $H_o$ the width of the strip domains and their distance, respectively, vary. The domain structure shown is stable with a field $H_o = O$, so that no bias voltage field is necessary and a device for producing small field variations $\Delta H$ is sufficient. The width of strip domain 6 is denoted by $L_2$ and the distance between the domains 6 and 7 by $L_1$. FIG. 3 shows the dependence of both the value $L_2/d$ and of the quantity $(L_1 + L_2)/d$ as a function of the reduced field $$h = \frac{Ho}{4\pi M_s}.$$

It is obvious that when $h$ is approximately 0.5, in particular the value $L_1 + L_2$ (the lattice distance of the strip domains) very considerably depends upon the value of $h$.

Figure 4:
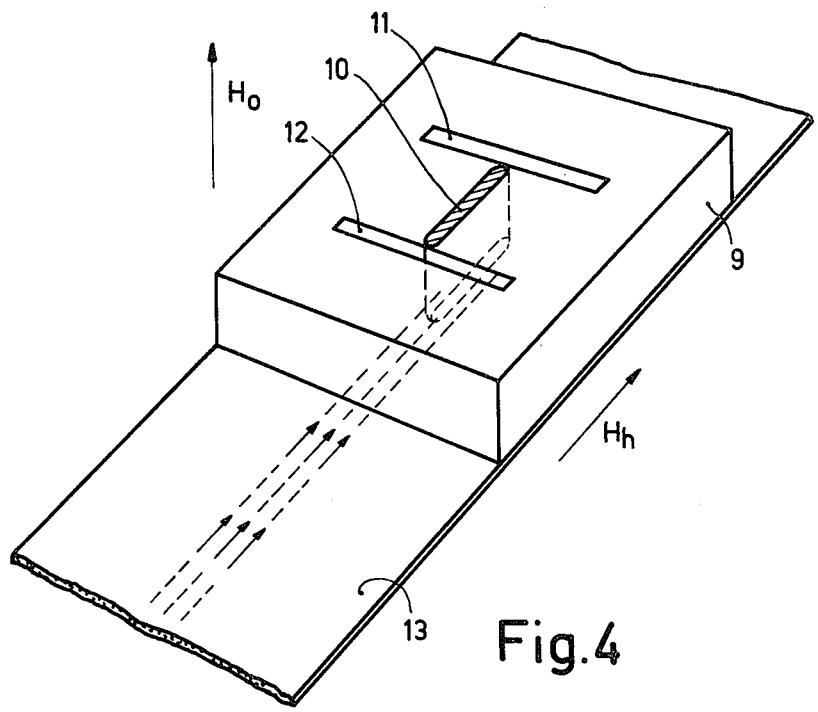
FIG. 4 shows a plate of magnetisable material having an acicular strip domain.

Elongate magnetic domains can be fixed in a desired location in a well known manner. For that purpose, for example, a recess or boss of the plate, a strip of highly permeable magnetic material, or an electric conductor through which a constant current flows is present in the immediate proximity of each domain. The said fixing means are opportune in particular when the plate 9 is to comprise an acicular domain 10 as is shown in FIG. 4. Such an acicular domain 10 may be created by enclosing an elongate domain between the two fixing means 11 and 12 and by causing the field $H_o$ to increase considerably to beyond the stability range of the cylindrical domain (bubble). An acicular domain having a minimum width equal to two times the domain wall thickness is then formed which is secured to the fixing means with either end. Information can then be recorded by means of the stray field of a tip of the needle facing the recording medium 13. In this manner it is possible to record vary narrow tracks.

These tracks are narrower than tracks recorded by cylindrical domains in the same material. For recording information on the recording medium 13, an auxiliary field $H_h$ is preferably used which has a field strength which is smaller than the coercive strength of the medium 13 but which is so large that, together with the stray field of a tip of the needle, it can influence the magnetisation condition of the recording medium.

Another possibility of fixing the location of an elongate domain consists in that a certain curvature (for example, a cylindrical shape) is given to the plate which is to comprise the domains. This is shown in FIG. 5.

The plate or layer 14 of magnetisable material has a curved surface 15. Due to said design, the elongate domain 16 occupies the location shown and remains there. An extra advantage of this embodiment is that a favourable contact is obtained with the recording medium 16 so that little wear occurs during operation.

The above-mentioned fixing means determine on the one hand the direction of the strip domain and on the other hand the position thereof. Establishing the direction of the strip domain may also be carried out differently. For that purpose, a magnetic device is provided to produce, at the area of the layer, a magnetic field which is parallel to the surface of the layer and which has a strength in the order of magnitude of the anisotropy field of the material of the layer. The direction of this field then determines the direction in which the strip domains can exist. Since the length of the strip domain depends upon the value of the magnetic field which is parallel to the surface of the layer, the possibility exists to modulate the length of the domain by varying the strength of said field.

FIG. 6 shows a layer 18 of the material in question, which layer 18 is in a field $H_{\parallel}$. The layer 18 comprises a fixed domain 19 which is fixed as regards its location by means of an etched pit 20. The direction of the strip domain is determined by the direction of $H_{\parallel}$. By varying the strength of $H_{\parallel}$, the magnetisation direction M is slightly rotated. As a result of this, the perpendicular component of the domain magnetisation is varied and hence also the stray field acting on the recording medium 21. This provides a possibility of depth modulation.

The device according to the invention is preferably constructed so that the domain plate comprises at least one elongate domain which is present in the immediate proximity of an edge of the plate, the plate being determined to be arranged, during operation, transversely to the plane of the recording medium with the said edge facing the recording medium. The plate may then comprise either one elongate domain having its longitudinal axis parallel to the recording medium, or a number of elongate domains having the longitudinal axis perpendicular to the plane of the recording medium. In this case the cross-section of the plate is to be compared with the gap of a conventional magnetic head, the "flux" in the gap being determined by the domains which are present at the edge of the plate. The advantage of this construction is that the plate can simply be incorporated in a so-called floating shoe for use in disk memories and can generally be mounted simply on a support or form one assembly therewith.

FIG. 7 shows a particular application of a domain plate having domains in the proximity of one of the edges.

A domain plate 28 is provided near an edge with so-called "pinning points" 22, 23 for magnetic domains. These "pinning points" are, for example, permalloy dots or pits etched in the material of the plate. The domains 24, 25 are secured to said "pinning points". The positions of said points and the value of the bias magnetisation field $H_o$ have been chosen to be so that no or a very small field is present at the edge of the plate. This is possible in that the stray field of a domain and the stray field of the proximity of the domain have different signs and can hence compensate for each other in a given place. Local fields can now be produced by means of a current which is conveyed through the current loops 26, 27. Dependent upon the value of said field, each domain becomes smaller or larger, respectively more strip-like or less strip-like. When a domain withdraws from the edge, the stray field of the plate starts predominating at the edge of the plate (direction of the field upwards), in the other case the stray field of the domain starts predominating (direction of the field downwards). By varying the current through the current loop, signals of alternate polarity can thus be recorded, while it is particularly advantageous that there also is a possibility of non-recording (return to zero) in the case in which the stray fields compensate each other.

A further embodiment of the device according to the invention is characterized in that the strip domain is movable in a direction perpendicular to the direction of movement of the recording medium. This can be realized, for example, by means of a domain plate on which a meander-like current conductor is provided along the axis of which a domain is movable. In this manner a "scanning" magnetic head without mechanically moving components can be realised. This way of moving domains is known per se from "Journal of Applied Physics" 42, p. 1266, 1971.

A scanning magnetic head, however, can be realized particularly elegantly when the strip domain extends perpendicularly to the tape and is held at one end so that only the other end is movable. FIG. 8 shows such an arrangement.

A strip-shaped magnetic domain 41 extends in a plate of magnetizable material 42 in a direction perpendicular to the direction of movement 40 of the magnetic tape 43. This strip-shaped domain 41 is held in its place, for example, by a permalloy rail, or by two scratches (44, 45). An auxiliary field $H_h$ is applied in the longitudinal direction of the strip domain 41, so that only the end 46 of the strip domain 41 is capable of recording on the tape 43 which is bias-magnetized in the direction of the arrows 50. So the tape is magnetized by the strip domain 41 in a direction perpendicular to its longitudinal direction. By causing the field $H_o$ to increase in strength perpendicularly to the surface of the plate 42, the strip domain 41 becomes shorter (shown in broken lines). By hooking the other end of the strip domain in the place 47 on to a permalloy strip or the like, it can be ensured that the strip domain becomes shorter to one side only. When the field $H_o$ becomes uniformly stronger, the end 46 of the strip domain 41 then "scans" the tape 43. By modulating the field $H_o$ perpendicularly to the plate 42 not only with a frequency which ensures that the end of the strip scans the tape during one T.V. line period, but also with a much higher frequency which forms the video signal, a signal can also be recorded during scanning. The end of the strip domain swings as it were about a position, determined by the scan movement, with a frequency which is determined by the video signal. Upon playing back, the end of the strip again scans the tape 43, but now it starts swinging under the influence of the information on the tape, denoted by way of example by 52 and 53. As will be explained in greater detail, said swinging can be read by means of a magnetic-field-sensitive element 48. So the end of a strip domain may be seen as a bubble domain, with the advantage that it can be made stable more easily, need not be created and can be moved more easily. However, there are fewer modulation possibilities, while high requirements are also imposed upon the mobility of the material, because the strip domain must grow from small to large during the line flyback time. As additional advantage of a strip domain is, however, that its dimensions are less dependent on the material. By providing two scratches in the material, its width is determined rather by the distance between said scratches than by the material.

Playback of the recorded information is also possible with the present device. For that purpose it is preferably equipped with a magnetic field-sensitive element, for example a magneto-resistance element, which is provided on the side of the plate remote from the recording medium. When playing-back recorded information the length of the strip varies and this is detected by the magnetic field-sensitive element. In this case it is of advantage that the playback element is provided on the side of the plate remote from the recording medium so that it is not subject to detrition. The domain serves as it were as an intermediary for transmitting the information.

Such a construction is also shown in FIG. 8. For playing back the recorded information, a magnetic field-sensitive detector 48 (magnetoresistance, Hall-element or magnetic field diode) having connection points 49 and 49' is provided on the upper side of the plate 42. Upon playing back, the influencing of the strip domain by the magnetisation pattern on the tape 43 is detected by means of the element 48. An advantage of this construction is that the detector does not contact the recording medium.

What is claimed is:
1. A device for magnetic recording having a generally planar layer of a magnetisable material, said layer having an easy axis of magnetisation which is substantially perpendicular to said generally planar layer, said layer including means for supporting magnetic domains having a magnetisation direction which is opposite to the magnetisation direction of the remainder of said layer, means for supporting said layer, means for producing a magnetisation field having a field direction perpendicular to the plane of said layer, said layer cooperating with an associated recording medium which is relatively movable with respect to said layer, said layer of magnetisable material further comprising at least one elongate magnetic domain said elongate magnetic domain having one outside dimension measured in the plane of said planar layer which is greater than a second outside dimension measured in the plane of said generally planar layer, said device including means for modulating said one outside dimension of said elongate magnetic domain responsive to an information signal.

2. A device as claimed in claim 1, wherein said means for supporting said layer carries the layer with said one dimension of each elongate magnetic domain disposed transversly to the relative direction of movement of the recording medium.

3. A device as claimed in claim 1, wherein said layer is carried by said means for supporting with said one dimension of each elongate magnetic domain parallel to the relative direction of movement of the recording medium.

4. A device as claimed in claim 1, wherein the layer comprises a number of elongate magnetic domains, each being disposed parallel to the relative direction of movement of the recording medium, means being present to modulate the width of each domain.

5. A device as claimed in claim 4, where said generally planar layer makes an angle with the plane of the recording medium.

6. A device as claimed in claim 1, wherein said layer has a surface which is curved in one direction and which is disposed in facing relationship to a recording medium during operation, at least one elongate magnetic domain being present in the place having the largest cross-section.

7. A device as claimed in claim 1, wherein said layer is provided with means for the fixation of at least a part of an elongate magnetic domain at a stable position.

8. A device as claimed in claim 1 further including means to move at least one end of an elongate magnetic domain in a direction perpendicular to the direction of movement of the recording medium.

9. A device as claimed in claim 8, wherein the strength of said magnetic field is variable as a function of an associated information signal to be recorded.

10. A device as claimed in claim 1 further including magnetic means to fix the direction of each domain present in the layer, said magnetic means producing at the area of the layer, a magnetic field which is parallel to the surface of the layer, and which has a strength in the order of magnitude of the anisotropy field of the material of the material of the layer.

11. A device as claimed in claim 1, wherein said layer comprises at least one elongate domain which is present in the immediate proximity of an edge of the layer and said means for support carrying said layer being disposed transversely to the plane of the recording medium with said edge facing the recording medium.

12. A device as claimed in claim 1 wherein said layer has disposed in the immediate proximity of each elongate domain a magnetic field-sensitive element.

13. A device as claimed in claim 1 further including magnetic means for producing at the area of the recording medium a magnetic auxiliary field having a direction which is parallel to the relative direction of movement thereof, in which $H_h + H_d H_c$, with $H_h$ is the field strength of the auxiliary field, $H_d$ is the field strength of the stray field of an elongate domain and $H_c$ is the coercive field strength of the recording medium.

14. A device as claimed in claim 13 wherein the field strength $H_h$ is variable in accordance with an information signal to be recorded.

15. A device as claimed in claim 1 wherein in the plane of the said layer of magnetisable material the magnetic domain wall energy in one direction differs from that in the direction perpendicular thereto.

* * * * *